United States Patent [19]
Bolhofer

[11] 3,927,092
[45] Dec. 16, 1975

[54] AMIDES OF 2-[HALOPHENOXY (OR HALOPHENYLTHIO)]-ALKANOIC ACIDS

[75] Inventor: William A. Bolhofer, Frederick, Pa.

[73] Assignee: Merck & Co., Inc., Rahway, N.J.

[22] Filed: June 24, 1968

[21] Appl. No.: 739,147

[52] U.S. Cl....... 260/559 B; 260/500.5 H; 260/469; 260/470; 260/553 E; 260/556 CN; 260/558 S; 260/558 H; 260/559 H; 424/305; 424/317; 424/321; 424/322; 424/324
[51] Int. Cl.². ...................... C07C 103/82
[58] Field of Search ........ 260/559, 500.5, 453, 553, 260/556, 558

[56] References Cited
UNITED STATES PATENTS

| | | | |
|---|---|---|---|
| 3,087,805 | 4/1963 | Metivier | 71/118 |
| 3,168,561 | 2/1965 | Richter | 71/118 |
| 3,342,586 | 9/1967 | Lehureau et al | 71/119 |
| 3,352,897 | 11/1967 | Richter | 71/118 |
| 3,360,356 | 12/1967 | Vartiak | 71/110 |
| 3,371,106 | 2/1968 | Berliner | 71/118 |
| 3,392,194 | 7/1968 | Waring et al. | 260/559 |
| 3,439,018 | 4/1969 | Brookes et al. | 260/559 |
| 3,446,613 | 5/1969 | Berliner | 71/118 |
| 3,518,077 | 6/1970 | Berliner | 71/118 |

*Primary Examiner*—Harry I. Moatz
*Attorney, Agent, or Firm*—Hesna J. Pfeiffer; J. Jerome Behan

[57] ABSTRACT

Amide derivatives of 2-[halophenoxy(or halophenylthio)]alkanoic acids; a new class of compounds possessing hypocholesterolemic and hypolipemic properties, which are prepared by the reaction of an ester or an acid chloride of a 2-[halophenoxy(or halophenylthio)]alkanoic acid with an amine.

3 Claims, No Drawings

AMIDES OF 2-[HALOPHENOXY (OR HALOPHENYLTHIO)]-ALKANOIC ACIDS

This invention relates to a new class of chemical compounds, which can be described generally as amide derivatives of 2-[halophenoxy(or halophenylthio)]-alkanoic acids.

studies show that cholesterol and triglycerides play a major role in the formation of atherosclerotic plaques by accelerating the deposition of blood lipids on the arterial wall. It is the purpose of this invention to disclose a new class of chemical compounds which effectively reduce the concentration of cholesterol, triglycerides and other lipids in blood serum and, consequently, ameliorate conditions associated with blood lipid deposition.

The instant amides are products having the following general formula:

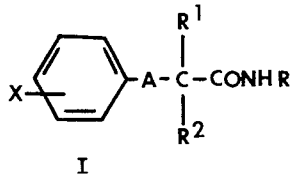

I wherein A is oxygen or sulfur; R is hydroxy; lower alkoxy, such as methoxy, ethoxy, propoxy, and the like; amino; carbamoyl; mono-lower alkylcarbamoyl, such as methylcarbamoyl, ethylcarbamoyl, and the like; di-lower alkylcarbamoyl, such as dimethylcarbamoyl, diethylcarbamoyl, and the like; amidino; $N^1$-lower alkylamidino, such as $N^1$-methylamidino, $N^1$-ethylamidino, and the like; $N^1,N^1$-di-lower alkyl amidino such as $N^1,N^1$-dimethylamidino $N^1,N^1$-diethylamidino, and the like; $N^1,N^2$-di-lower alkylamidino, such as $N^1,N^2$-dimethylamidino, $N^1,N^2$-diethylamidino, and the like; $N^1,N^1,N^2$ tri-lower alkylamidino wherein the alkyl group is methyl, ethyl, n-propyl and the like; or lower alkanesulfonyl, such as methanesulfonyl, ethanesulfonyl, and the like; $R^1$ and $R^2$ are lower alkyl such as methyl, ethyl and the like and X is halogen, such as chloro, bromo, fluoro or iodo.

A preferred embodiment of this invention relates to 2-[4-halophenoxy(and 4-halophenylthio)]alkanoic acid amides of the following formula:

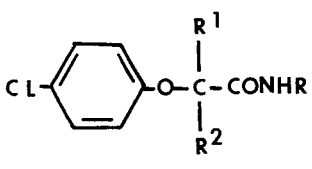

Ia wherein R is hydroxy; lower alkoxy, such as methoxy, ethoxy and the like; amino; carbamoyl, $N^1,N^1$-di-lower alkylamidino, such as $N^1,N^1$-dimethyl amidino, $N^1,N^1$-diethyl amidino and the like; and lower alkanesulfonyl, such as methanesulfonyl and the like; and $R^1$ and $R^2$ are lower alkyl such as methyl, ethyl and the like. The foregoing class of compounds exhibits particularly good hypocholesterolemic and hypolipemic activity and represents a preferred group within the scope of this invention.

The products (I) of this invention are conveniently prepared by treating a 2-[halophenoxy(or halophenylthio)]alkanoyl halide with an appropriate amine. The reaction is conducted in a solvent which is substantially inert with respect to the reactants as, for example, in diethyl ether, in a lower alkanol such as methanol or in tetrahydrofuran, and the like. The reaction may be conducted at ambient temperatures but, in general, the application of heat facilitates the reaction as, for example, by heating at a temperature of 80°–100°C. The following equation represents the method by which the 2-[halophenoxy(or halophenylthio)]alkanoic acid amides are prepared:

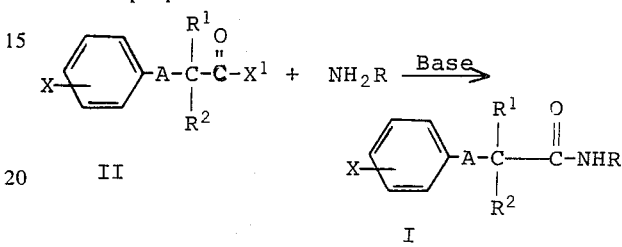

wherein X and $X^1$ are halogen, for example chloro, bromo and the like and A, R, $R^1$ and $R^2$ are as defined above.

The 2-[halophenoxy(or halophenylthio)]alkanoic amides of this invention may also be prepared by the alternate method of treating a lower alkyl 2-[halophenoxy(or halophenylthio)] lower alkanoic acid ester with an appropriate amine. The reaction is advantageously conducted at elevated temperatures or, when low boiling solvents are used, the reaction is preferably carried out over an extended period of time. Thus, for example, when acetone is the solvent employed the reaction is preferably conducted over a period of about 15–25 hours. The following equation illustrates this method of preparation:

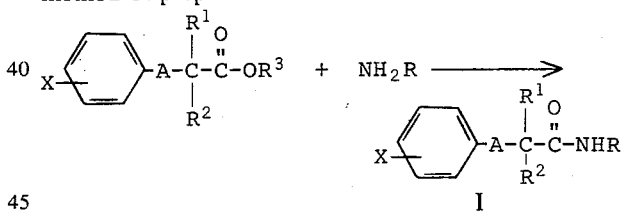

wherein $R^3$ is lower alkyl and A, R, $R^1$, $R^2$ and X are as defined above.

The instant 2-[halophenoxy(or halophenylthio)]alkanoic acid amides (I) may be purified by recrystallization from a suitable solvent such as methanol, ethanol, hexane, n-butylchloride, benzene, and the like or from a mixture of solvents such as acetonitrile/water, and the like.

The 2-[halophenoxy(or halophenylthio)]alkanoic acid halide starting materials are either known or may be prepared by treating the 2-[halophenoxy(or halophenylthio)]alkanoic acid with a suitable halogenating agent such as thionyl bromide or thionyl chloride.

There is no clear agreement about the actual role of cholesterol and triglyceride synthesis in the formation of atherosclerotic plaques, but numerous studies support the concept that cholesterol and triglycerides play a major role in the pathogenesis of atherosclerosis because along with other lipids and fibrin they accumulate in the arterial intima and subintima and produce arterial corrosion.

Since cholesterol and triglycerides are present to some extent in all ordinary diets, and since they are also synthesized by body organs from intermediates of metabolic origin, the development of some chemotherapeutic agent which will induce a significant reduction in the serum cholesterol and triglyceride level has been found desirable. For this reason, the 2-[halophenoxy (and halophenylthio)]alkanoic acid amides of the instant invention were synthesized, tested and found to exhibit good hypocholesterolemic and hypolipemic activity.

The following examples illustrate the 2-[halophenoxy (and halophenylthio)]alkanoic acid amides (I) of this invention and the methods by which they are prepared. However, the examples are illustrative only and it will be apparent to those having ordinary skill in the art that all of the instant products may be prepared in an analogous manner by substituting the appropriate starting materials for those set forth in the examples.

EXAMPLE 1

N-Hydroxy-2-(4-chlorophenoxy)-2-methylpropionamide

Step A:
2-(4-chlorophenoxy)-2-methylpropionylchloride

A solution of 2-(4-chlorophenoxy)-2-methylpropionic acid (21.5 g., 0.1 mole) and thionyl chloride (13.1 g., 0.11 mole) is refluxed for 15 minutes. The excess thionyl chloride is evaporated and the residue distilled to afford 2-(4-chlorophenoxy)-2-methylpropionylchloride.

Step B:
N-Hydroxy-2-(4-chlorophenoxy)-2-methylpropionamide 2-(4-Chlorophenoxy)-2-methylpropionylchloride (9.23 g., 0.04 mole) is added over a 10-minute period to a chilled (5°C.) mixture of ether (100 ml.), hydroxylamine hydrochloride (2.8 g., 0.04 mole) and anhydrous sodium carbonate (4.24 g., 0.04 mole). Water (7 ml.) is added and the mixture is stirred for 2 hours. The crystalline product which separates is collected, washed with water and dried. Recrystallization from n-butylchloride (150 ml.) yields 5.3 grams of N-hydroxy-2-(4-chlorophenoxy)-2-methylpropionamide, m.p. 129°–131°C.

EXAMPLE 2

N-Methoxy-2-(4-chlorophenoxy)-2-methylpropionamide

A solution of methoxyamine (4.7 g., 0.1 mole) in 25 ml. of ether is added to a stirred, cooled solution of 2-(4-chlorophenoxy)-2-methylpropionylchloride (11.65 g., 0.05 mole) in 75 ml. of ether. After 30 minutes at room temperature, the reaction mixture is extracted with two 100 ml. portions of water. The ether solution is dried over magnesium sulfate, filtered and evaporated under reduced pressure. Trituration of the residual oil with petroleum ether induces crystallization. Recrystallization from 200 ml. of hexane yields 9.5 grams of N-methoxy-2-(4-chlorophenoxy)-2-methylpropionamide, m.p. 71°–73°C.

EXAMPLE 3

N-($N^1$,$N^1$-Dimethylamidino)-2-(4-chlorophenoxy)-2-methylpropionamide 2-(4-Chlorophenoxy)-2-methylpropionylchloride (7.0 g., 0.03 mole) is added to a 30 ml. solution of 1,1-dimethylguanidine in methyl alcohol. [The solution of 1,1-dimethylguanidine is prepared by refluxing a solution of sodium methoxide (5.4 g., 0.1 mole) and dimethylguanidine sulfate (15.0 g., 0.11 mole) in 200 ml. of methyl alcohol for 45 minutes. The solution is cooled, filtered and evaporated to approximately 30 ml.]. The mixture is heated at steam bath temperature for 10 minutes. The methyl alcohol is evaporated under vacuum and the residue is washed by decantation with water. The residue is dissolved in dilute acid, extracted with ether and the aqueous solution is then made alkaline with 5% sodium hydroxide. The crude N-($N^1$,$N^1$-dimethylamidino)-2-(4-chlorophenoxy)-2-methylpropionamide which precipitates is collected, dried and recrystallized from benzene. Additional recrystallization from acetonitrile/water (1:3) yields 2.2 grams of N-($N^1$,$N^1$-dimethylamidino)-2-(4-chlorophenoxy)-2-methylpropionamide, m.p. 118°–120°C.

EXAMPLE 4

N-Methanesulfonyl-2-(4-chlorophenoxy)-2-methylpropionamide 2-(4-Chlorophenoxy)-2-methylpropionylchloride (4.66 g., 0.02 mole) in 50 ml. of tetrahydrofuran is added over a 15-minute period to a solution of the sodium salt of methanesulfonamide (2.51 g., 0.021 mole) in 50 ml. of tetrahydrofuran at 0°–5°C., under a dry nitrogen atmosphere. The mixture is stirred at 20°C. for 20 hours and then the solvent is evaporated under vacuum. The residue is dissolved in chloroform and the solution is extracted with water. The chloroform is evaporated and the product is crystallized from n-butylchloride to yield N-methanesulfonyl-2-(4-chlorophenoxy)-2-methylpropionamide, m.p. 153°–155°C.

EXAMPLE 5

N-Amino-2-(4-chlorophenoxy)-2-methylpropionamide

Ethyl 2-(4-chlorophenoxy)-2-methylpropionate (12.15 g., 0.05 mole) and hydrazine hydrate (33 g., 0.066 mole) are mixed and heated at 140°C. in a sealed bomb for 8 hours. The resulting oil is distilled at 0.1 mm. and the fraction boiling at 143°–145°C. is collected. Trituration with water yields a crystalline product which is dried and recrystallized from hexane to give 1.8 grams of N-amino-2-(4-chlorophenoxy)-2-methylpropionamide, m.p. 81°–83°C.

EXAMPLE 6

N-Carbamoyl 2-(4-chlorophenoxy)-2-methylpropionamide

Ethyl 2-(4-chlorophenoxy)-2-methylpropionate (29.25 g., 0.12 mole) and sodium urea (5.0 g., 0.06 mole) are added to 25 ml. of acetone and the mixture is stirred at 20°C. for 20 hours. Water (100 ml.) is added and the mixture is acidified with 6N hydrochloric acid. The water layer is decanted and the residue is stirred with 100 ml. of ethyl alcohol. 1.8 Grams of N-carbamoyl 2-(4-chlorophenoxy)-2-methylpropionamide is obtained which is recrystallized from 50 ml. of ethyl alcohol to give 1.6 grams of pure N-carbamoyl 2-(4-chlorophenoxy)-2-methylpropionamide, m.p. 192°–193°C.

EXAMPLE 7

N-(N¹-methylamidino)-2-(3-chlorophenoxy)-2-methylpropionamide

Step A:

2-(3-chlorophenoxy)-2-methylpropionylchloride

In a manner similar to that described in Step A, Example 1, and by substituting an equimolar quantity of 2-(3-chlorophenoxy)-2-methylpropionic acid for the 2-(4-chlorophenoxy)-2-methylpropionic acid described therein, there is obtained 2-(3-chlorophenoxy)-2-methylpropionylchloride.

Step B:

N-(N¹-methylamidino)-2-(3-chlorophenoxy)-2-methyl propionamide

Guanidine (0.02 mole) is prepared by refluxing a mixture of guanidine hydrochloride (1.92 g., 0.02 mole) in sodium methoxide (1.08 g., 0.02 mole) in methanol (25 ml.) for 1 hour. This mixture is filtered and the filtrate is evaporated under vacuum at room temperature to yield guanidine which is then mixed with a solution of 2-(3-chlorophenoxy)-2-methylpropionylchloride (4.66 g., 0.02 mole) in 50 ml. of tetrahydrofuran. The solution is stirred for two hours and the solvent is evaporated to yield N-(N¹-methylamidino)-2-(3-chlorophenoxy)-2-methylpropionamide.

EXAMPLE 8

N-ethanesulfonyl-2-(2-chlorophenoxy)-2-methylpropionamide

Step A:

2-(2-chlorophenoxy)-2-methylpropionylchloride

In a manner similar to that described in Step A, Example 1, and by substituting an equimolar quantity of 2-(2-chlorophenoxy)-2-methylpropionic acid for the 2-(4-chlorophenoxy)-2-methylpropionic acid described therein, there is obtained 2-(2-chlorophenoxy)-2-methylpropionylchloride.

Step B:

N-ethanesulfonyl-2-(2-chlorophenoxy)-2-methylpropionamide

By substituting an equimolar quantity of 2-(2-chlorophenoxy)-2-methylpropionylchloride and the sodium salt of ethanesulfonamide for the 2-(4-chlorophenoxy)-2-methylpropionylchloride and sodium salt of methanesulfonamide of Example 4 and by following substantially the procedure described therein, there is prepared N-ethanesulfonyl-2-(2-chlorophenoxy)-2-methylpropionamide.

In a manner similar to those described in Example 1 and Example 5 all of the products of this invention may be obtained. Thus, by substituting the appropriate acid halide and amine for the 2-(4-chlorophenoxy)-2-methylpropionyl chloride and hydroxylamine hydrochloride of Example 1 and by substituting the appropriate ester and amine for the ethyl 2-(4-chlorophenoxy)-2-methylpropionate and hydrazine hydrate reactants described in Example 5 and by following the procedure described therein all of the amide products (I) of this invention may be obtained. The following equation illustrates the manner in which the products of Table I are obtained.

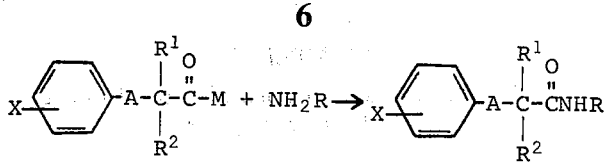

TABLE OF EXAMPLES

Table I

| Ex. | A | M | R | R¹ | R² | X |
|---|---|---|---|---|---|---|
| 9 | O | $-OC_2H_5$ | $-NH_2$ | $-CH_3$ | $-CH_3$ | 4—Cl |
| 10 | O | Cl | $-OH$ | $-CH_3$ | $-CH_3$ | 4—Br |
| 11 | O | Cl | $-\overset{NH}{\underset{\|\|}{C}}-NH_2$ | $-CH_3$ | $-CH_3$ | 3—Cl |
| 12 | S | Cl | $-\overset{NH}{\underset{\|\|}{C}}-NHCH_3$ | $-CH_3$ | $-CH_3$ | 4—Cl |
| 13 | O | Cl | $-\overset{NCH_3}{\underset{\|\|}{C}}-N\overset{CH_3}{\underset{H}{}}$ | $-CH_3$ | $-C_2H_5$ | 4—Cl |
| 14 | O | Cl | $-\overset{NCH_3}{\underset{\|\|}{C}}-N\overset{C_2H_5}{\underset{CH_3}{}}$ | $-CH_3$ | $-CH_3$ | 4—Br |
| 15 | O | $-OCH_3$ | $-\overset{O}{\underset{\|\|}{C}}-N\overset{CH_3}{\underset{H}{}}$ | $-CH_3$ | $-CH_3$ | 4—Cl |
| 16 | O | $-OC_2H_5$ | $-\overset{O}{\underset{\|\|}{C}}-N\overset{CH_3}{\underset{C_2H_5}{}}$ | $-CH_3$ | $-CH_3$ | 4—F |

The products of the invention can be administered in a wide variety of therapeutic dosages in conventional vehicles as, for example, by oral administration in the form of a capsule or tablet as well as by intravenous injection. Also, the dosage of the products may be varied over a range as, for example, in the form of capsules or scored tablets containing 5, 10, 20, 25, 50, 100, 150, 250 and 500 milligrams, that is, from 5 to about 500 milligrams, of the active ingredient for the symptomatic adjustment of the dosage to the host to be treated. These dosages are well below the toxic or lethal dose of the products.

A suitable unit dosage form of the products of this invention can be prepared by mixing 150 mg. of an amide of 2-[halophenoxy(or halophenylthio)]alkanoic acid (I), with 44 mg. of lactose and 6 mg. of magnesium stearate and placing the 200 mg. mixture into a No. 3 gelatin capsule. Similarly, by employing more of the active ingredient and less lactose, other dosage forms can be put in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to those skilled in the art.

It is also within the scope of this invention to combine two or more of the compounds of this invention in a unit dosage form or to combine one or more of the compounds with other known hypocholesterolemics and hypolipemics or with other desired therapeutic and/or nutritive agents in dosage unit form.

The following example is included to illustrate the preparation of a representative dosage form.

EXAMPLE 17

Dry-filled Capsules Containing 150 mg. of Active Ingredient per Capsule

|  | Per Capsule |
|---|---|
| N-Methoxy-2-(4-chloro-phenoxy)-2-methyl-propionamide | 150 mg. |
| Lactose | 44 mg. |
| Magnesium stearate | 6 mg. |
| Capsule size No. 3 | 200 mg. |

The N-methoxy-2-(4-chlorophenoxy)-2-methylpropionamide is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredients of the above example by any of the other novel compounds of this invention.

It will be apparent from the foregoing description that the 2-[halophenoxy (or halophenylthio)]alkanoic acid amides of this invention constitute a valuable class of compounds which have not been prepared before. One skilled in the art will also appreciate that the processes disclosed in the above examples are merely illustrative and are capable of a wide variation and modification without departing from the spirit of this invention.

What is claimed is:

1. A compound of the formula:

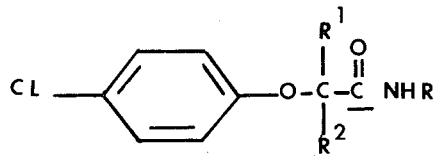

wherein R is $N^1,N^1$-diloweralkylamidino or $N^1$-loweralkylamidino and $R^1$ and $R^2$ are lower alkyl.

2. The compound of claim 1 wherein R is ($N^1,N^1$-dimethylamidino).

3. The compound of claim 1 wherein R is $N^1$-methylamidino.

* * * * *